United States Patent
Wayda et al.

(10) Patent No.: US 8,200,631 B2
(45) Date of Patent: *Jun. 12, 2012

(54) SNAPSHOT RESET METHOD AND APPARATUS

(75) Inventors: James George Wayda, Laguna Niguel, CA (US); Kent Lee, Ladera Ranch, CA (US); Ngoclan Thi Vu, Irvine, CA (US); Elizabeth Guadalupe Rodriguez, Carlsbad, CA (US)

(73) Assignee: Dot Hill Systems Corporation, Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/780,891

(22) Filed: May 15, 2010

(65) Prior Publication Data

US 2010/0223428 A1    Sep. 2, 2010

Related U.S. Application Data

(62) Division of application No. 11/768,127, filed on Jun. 25, 2007.

(51) Int. Cl.
    *G06F 17/30* (2006.01)
(52) U.S. Cl. ......... 707/639; 707/649; 707/640; 707/633
(58) Field of Classification Search .................. 707/649, 707/639, 640, 633
    See application file for complete search history.

(56) References Cited

U.S. PATENT DOCUMENTS

| | | |
|---|---|---|
| 5,551,046 A | 8/1996 | Mohan et al. |
| 5,778,189 A | 7/1998 | Kimura et al. |
| 5,812,843 A | 9/1998 | Yamazaki et al. |
| 5,963,962 A | 10/1999 | Hitz et al. |
| 6,073,209 A | 6/2000 | Bergsten et al. |
| 6,076,148 A | 6/2000 | Kedem |
| 6,289,356 B1 | 9/2001 | Hitz et al. |
| 6,292,808 B1 | 9/2001 | Obermarck et al. |
| 6,341,341 B1 | 1/2002 | Grummon et al. |
| 6,548,634 B1 | 4/2003 | Ballinger et al. |
| 6,557,079 B1 | 4/2003 | Mason, Jr. et al. |
| 6,594,744 B1 | 7/2003 | Humlicek et al. |
| 6,615,223 B1 | 9/2003 | Shih et al. |
| 6,711,409 B1 | 3/2004 | Zavgren et al. |
| 6,771,843 B1 | 8/2004 | Huber et al. |
| 6,792,518 B2 | 9/2004 | Armangau et al. |

(Continued)

FOREIGN PATENT DOCUMENTS

CA       2165912      6/1997

(Continued)

OTHER PUBLICATIONS

Office Action in Application in U.S. Appl. No. 11/277,738, Apr. 3, 2007, 14 pages.

(Continued)

*Primary Examiner* — Angela M Lie
*Assistant Examiner* — Fatima Mina
(74) *Attorney, Agent, or Firm* — Thomas J. Lavan (57) ABSTRACT

A method, device, and system for resetting snapshots are provided. The reset of a snapshot incorporates the traditional snapshot delete and snapshot create operations into a single operation. Additionally, a snapshot created under the reset operation may receive an array partition from a snapshot being deleted under the same snapshot reset operation thereby retaining its identifying characteristics.

8 Claims, 5 Drawing Sheets

U.S. PATENT DOCUMENTS

| | | | |
|---|---|---|---|
| 6,907,512 B2 | 6/2005 | Hill et al. | |
| 6,957,362 B2 | 10/2005 | Armangau et al. | |
| 7,047,380 B2 | 5/2006 | Tormasov et al. | |
| 7,050,457 B2 | 5/2006 | Erfurt et al. | |
| 7,100,089 B1 | 8/2006 | Phelps et al. | |
| 7,165,156 B1 | 1/2007 | Cameron et al. | |
| 7,191,304 B1 | 3/2007 | Cameron et al. | |
| 7,194,550 B1 | 3/2007 | Chamdani et al. | |
| 7,206,961 B1 | 4/2007 | Mutalik et al. | |
| 7,243,157 B2 | 7/2007 | Levin et al. | |
| 7,272,686 B2 | 9/2007 | Yagisawa et al. | |
| 7,313,581 B1* | 12/2007 | Bachmann et al. | 707/759 |
| 7,363,444 B2 | 4/2008 | Ji et al. | |
| 7,373,366 B1 | 5/2008 | Chatterjee et al. | |
| 7,426,618 B2 | 9/2008 | Vu et al. | |
| 7,526,640 B2 | 4/2009 | Bejarano et al. | |
| 7,593,973 B2 | 9/2009 | Lee et al. | |
| 2001/0039629 A1 | 11/2001 | Feague et al. | |
| 2002/0083037 A1* | 6/2002 | Lewis et al. | 707/1 |
| 2002/0091670 A1 | 7/2002 | Hitz et al. | |
| 2002/0099907 A1* | 7/2002 | Castelli et al. | 711/113 |
| 2002/0112084 A1 | 8/2002 | Deen et al. | |
| 2003/0154314 A1 | 8/2003 | Mason, Jr. et al. | |
| 2003/0158863 A1 | 8/2003 | Haskin et al. | |
| 2003/0167380 A1 | 9/2003 | Green et al. | |
| 2003/0188223 A1 | 10/2003 | Alexis et al. | |
| 2003/0191745 A1 | 10/2003 | Jiang et al. | |
| 2003/0229764 A1 | 12/2003 | Ohno et al. | |
| 2004/0030727 A1 | 2/2004 | Armangau et al. | |
| 2004/0030846 A1 | 2/2004 | Armangau et al. | |
| 2004/0034647 A1 | 2/2004 | Paxton et al. | |
| 2004/0054131 A1 | 3/2004 | Ballinger et al. | |
| 2004/0093555 A1 | 5/2004 | Therrien et al. | |
| 2004/0117567 A1 | 6/2004 | Lee et al. | |
| 2004/0133718 A1 | 7/2004 | Kodama et al. | |
| 2004/0172509 A1 | 9/2004 | Takeda et al. | |
| 2004/0204071 A1 | 10/2004 | Bahl et al. | |
| 2004/0260673 A1 | 12/2004 | Hitz et al. | |
| 2004/0267836 A1 | 12/2004 | Armangau et al. | |
| 2005/0004979 A1 | 1/2005 | Berkowitz et al. | |
| 2005/0044088 A1 | 2/2005 | Lindsay et al. | |
| 2005/0065985 A1* | 3/2005 | Tummala et al. | 707/201 |
| 2005/0066095 A1 | 3/2005 | Mullick et al. | |
| 2005/0071393 A1 | 3/2005 | Ohno et al. | |
| 2005/0122791 A1 | 6/2005 | Hajeck et al. | |
| 2005/0166022 A1 | 7/2005 | Watanabe et al. | |
| 2005/0182910 A1 | 8/2005 | Stager et al. | |
| 2005/0193180 A1 | 9/2005 | Fujibayashi et al. | |
| 2005/0198452 A1 | 9/2005 | Watanabe et al. | |
| 2005/0240635 A1 | 10/2005 | Kapoor et al. | |
| 2005/0246397 A1 | 11/2005 | Edwards et al. | |
| 2005/0246503 A1 | 11/2005 | Fair et al. | |
| 2006/0020762 A1 | 1/2006 | Urmston | |
| 2006/0053139 A1 | 3/2006 | Marzinski et al. | |
| 2006/0064541 A1 | 3/2006 | Kano et al. | |
| 2006/0107006 A1 | 5/2006 | Green et al. | |
| 2006/0155946 A1 | 7/2006 | Ji et al. | |
| 2006/0212481 A1 | 9/2006 | Stacey et al. | |
| 2006/0271604 A1 | 11/2006 | Shoens et al. | |
| 2007/0011137 A1 | 1/2007 | Kodama | |
| 2007/0038703 A1 | 2/2007 | Tendjoukian et al. | |
| 2007/0055710 A1 | 3/2007 | Malkin et al. | |
| 2007/0094466 A1* | 4/2007 | Sharma et al. | 711/162 |
| 2007/0100808 A1 | 5/2007 | Balogh et al. | |
| 2007/0143563 A1* | 6/2007 | Pudipeddi et al. | 711/173 |
| 2007/0185973 A1 | 8/2007 | Wayda et al. | |
| 2007/0186001 A1 | 8/2007 | Wayda et al. | |
| 2007/0198605 A1* | 8/2007 | Saika | 707/202 |
| 2007/0266066 A1 | 11/2007 | Kapoor et al. | |
| 2007/0276885 A1 | 11/2007 | Valiyaparambil et al. | |
| 2008/0072003 A1 | 3/2008 | Vu et al. | |
| 2008/0082593 A1 | 4/2008 | Komarov et al. | |
| 2008/0177954 A1 | 7/2008 | Lee et al. | |
| 2008/0177957 A1 | 7/2008 | Lee et al. | |
| 2008/0256141 A1 | 10/2008 | Wayda et al. | |
| 2008/0256311 A1 | 10/2008 | Lee et al. | |
| 2008/0281875 A1 | 11/2008 | Wayda et al. | |
| 2008/0281877 A1 | 11/2008 | Wayda et al. | |
| 2009/0307450 A1 | 12/2009 | Lee et al. | |

FOREIGN PATENT DOCUMENTS

| | | |
|---|---|---|
| EP | 1003103 | 5/2005 |
| WO | WO 94/29807 | 12/1994 |
| WO | WO 02/50716 | 6/2002 |
| WO | WO 2005/111773 | 11/2005 |
| WO | WO 2005/111802 | 11/2005 |

OTHER PUBLICATIONS

Office Action in Application in U.S. Appl. No. 11/277,738, Jul. 31, 2007, 8 pages.
Office Action in U.S. Appl. No. 11/277,738, Dec. 6, 2007, 9 pages.
Notice of Allowance in U.S. Appl. No. 11/277,738, Mar. 20, 2008, 6 pages.
Tanh Q., Office Action in U.S. Appl. No. 11/561,512, Apr. 3, 2009, 11 pages.
Official Action for U.S. Appl. No. 11/561,512, mailed Jun. 25, 2009.
Office Action in U.S. Appl. No. 11/561,512, Oct. 30, 2009, 9 pages.
Office Action in U.S. Appl. No. 11/561,512, Dec. 10, 2009.
Office Action in U.S. Appl. No. 11/561,512, Mar. 18, 2010.
Office Action in U.S. Appl. No. 11/779,965, Jan. 29, 2010.
Notice of Allowance for U.S. Appl. No. 11/560,174, mailed Feb. 9, 2009.
Official Action for U.S. Appl. No. 11/560,174, mailed Sep. 5, 2008.
Official Action for U.S. Appl. No. 11/945,940, mailed Mar. 5, 2010.
Official Action for U.S. Appl. No. 11/747,109, mailed Mar. 9, 2009.
Official Action for U.S. Appl. No. 11/747,109, mailed Sep. 21, 2009.
Official Action for U.S. Appl. No. 11/747,109, mailed Dec. 14, 2009.
Official Action for U.S. Appl. No. 11/747,109, mailed Mar. 30, 2010.
Official Action for U.S. Appl. No. 11/747,127, mailed Apr. 15, 2009.
Official Action for U.S. Appl. No. 11/747,127, mailed Oct. 6, 2009.
Official Action for U.S. Appl. No. 11/747,127, mailed Jan. 6, 2010.
Notice of Allowance for U.S. Appl. No. 11/747,127, mailed May 14, 2010.
Official Action for U.S. Appl. No. 11/624,565, mailed Mar. 30, 2009.
Official Action for U.S. Appl. No. 11/624,565, mailed Nov. 30, 2009.
Official Action for U.S. Appl. No. 11/624,524, mailed Dec. 11, 2008.
Official Action for U.S. Appl. No. 11/624,524, mailed Jun. 16, 2009.
Official Action for U.S. Appl. No. 11/624,524, mailed Sep. 16, 2009.
Official Action for U.S. Appl. No. 11/624,524, mailed Jan. 26, 2010.
Official Action for U.S. Appl. No. 11/734,081, mailed May 8, 2009.
Official Action for U.S. Appl. No. 11/734,081, mailed Aug. 21, 2009.
Notice of Allowance for U.S. Appl. No. 11/734,081, mailed Feb. 2, 2010.
Notice of Allowance for U.S. Appl. No. 11/734,081, mailed Mar. 10, 2010.
International Search Report from the PCT dated Mar. 27, 2007 with regard to corresponding PCT Application No. PCT/US/06/32506, 3 pages.
Written Opinion from the PCT dated Mar. 27, 2007 with regard to corresponding PCT Application No. PCT/US/06/32506, 10 pages.
International Search Report from the PCT dated Aug. 7, 2008 with regard to corresponding PCT Application No. PCT/US/08/57326, 2 pages.
Written Opinion from the PCT dated Aug. 7, 2008 with regard to corresponding PCT Application No. PCT/US/08/57326, 6 pages.
International Preliminary Report on Patentability and Written Opinion from the PCT dated Oct. 22, 2009 with regard to corresponding PCT Application No. PCT/US/08/57326, 10 pages.
Analysis from foreign associate dated Oct. 22, 2009 from 1st office action from Chinese patent office for application 200680032724.8.
International Preliminary Report on Patentability and Written Opinion from the PCT dated Mar. 20, 2008 with regard to corresponding PCT Application No. PCT/US/06/032506, 10 pages.
Office Action in U.S. Appl. No. 11/779,965, Jun. 24, 2010.
Notice of Allowance for U.S. Appl. No. 11/945,940, mailed Jun. 18, 2010.
Notice of Allowance for U.S. Appl. No. 11/945,940, mailed Jul. 13, 2010.

Notice of Allowance for U.S. Appl. No. 11/747,127, mailed Jun. 2, 2010.
Notice of Allowance for U.S. Appl. No. 11/747,127, mailed Jun. 15, 2010.
Notice of Allowance for U.S. Appl. No. 11/747,127, mailed Jul. 13, 2010.
Official Action for U.S. Appl. No. 11/768,127, mailed Jun. 1, 2010.
Examiner's answer in U.S. Appl. No. 11/561,512, Sep. 2, 2010.
Office Action in U.S. Appl. No. 11/561,680, Nov. 5, 2010.
Notice of Allowance for U.S. Appl. No. 11/624,565, mailed Sep. 14, 2010.
Examiner's answer for U.S. Appl. No. 11/624,524, mailed Sep. 10, 2010.
Official Action for U.S. Appl. No. 12/780,891, mailed Sep. 20, 2010.
Notice of Allowance for U.S. Appl. No. 11/624,565, mailed Sep. 29, 2010.
Office Action in U.S. Appl. No. 11/561,680, Apr. 15, 2011.
Notice of Allowance for U.S. Appl. No. 11/779,965, mailed May 16, 2011.
Notice of Allowance for U.S. Appl. No. 11/779,965, mailed May 27, 2011.
Official Action for U.S. Appl. No. 11/747,109, mailed Mar. 18, 2011.
Notice of Allowance for U.S. Appl. No. 11/747,109, mailed Apr. 29, 2011.
Notice of Allowance for U.S. Appl. No. 11/747,109, mailed Jul. 11, 2011.
Official Action for U.S. Appl. No. 11/768,127, mailed Dec. 28, 2011.
Official Action for U.S. Appl. No. 12/540,243, mailed Feb. 2, 2012.

* cited by examiner

SNAPSHOT RESET METHOD AND APPARATUS

CROSS REFERENCE TO RELATED APPLICATION(S)

This application is a divisional of application Ser. No. 11/768,127, filed Jun. 25, 2007.

This application is related to the following co-pending U.S. patent applications:

| Ser. No. (Docket No.) | Filing Date | Title |
| --- | --- | --- |
| 11/561,512 (DHP0057 US) | Nov. 20, 2006 | DATA REPLICATION METHOD AND APPARATUS |
| 11/561,680 (DHP0058 US) | Nov. 20, 2006 | PULL DATA REPLICATION MODEL |
| 11/779,965 (DHP0068 US) | Jul. 19, 2007 | METHOD AND APPARATUS FOR SEPARATING SNAPSHOT PRESERVED AND WRITE DATA |
| 11/945,940 (DHP0070 US) | Nov. 27, 2007 | METHOD AND APPARATUS FOR MASTER VOLUME ACCESS DURING VOLUME COPY |
| 11/747,109 (DHP0071 US) | May 10, 2007 | AUTOMATIC TRIGGERING OF BACKING STORE RE-INITIALIZATION |
| 11/747,127 (DHP0072 US) | May 10, 2007 | BACKING STORE REINITIALIZATION METHOD AND APPARATUS |
| 11/624,565 (DHP0073 US) | Jan. 18, 2007 | DELETION OF ROLLBACK SNAPSHOT PARTITION |
| 11/624,524 (DHP0074 US) | Jan. 18, 2007 | METHOD AND APPARATUS FOR QUICKLY ACCESSING BACKING STORE METADATA |
| 12/540,243 (DHP0083 US) | Aug. 12, 2009 | SNAPSHOT PRESERVED DATA CLONING |

FIELD OF THE INVENTION

The present invention is directed to data storage management. In particular, the present invention is directed to methods and apparatuses for re-setting snapshots.

BACKGROUND OF THE INVENTION

Historically, the need to store digital files, documents, pictures, images and other data continues to increase rapidly. In connection with the electronic storage of data, various data storage systems have been devised for the rapid and secure storage of large amounts of data. Such systems may include one or a plurality of storage devices that are used in a coordinated fashion. Systems in which data can be distributed across multiple storage devices such that data will not be irretrievably lost if one of the storage devices (or in some cases, more than one storage device) fails are also available. Systems that coordinate operation of a number of individual storage devices can also provide improved data access and/or storage times. Examples of systems that can provide such advantages can be found in the various RAID (redundant array of independent disks) levels that have been developed. Whether implemented using one or a plurality of storage devices, the storage provided by a data storage system can be treated as one or more storage volumes.

In order to facilitate the availability of desired data, it is often advantageous to maintain different versions of a data storage volume. Indeed, data storage systems are available that can provide at least limited data archiving through backup facilities and/or snapshot facilities. The use of snapshot facilities greatly reduces the amount of storage space required for archiving large amounts of data.

Snapshots provide a versatile feature that is useful for data recovery operations, such as backup and recovery of storage elements. However, traditional backup systems are limited by snapshot system requirements and restrictions. More specifically, backup systems using snapshot applications for backups typically have to configure backup settings based on the features and parameters defined by the snapshot application. Most backup systems perform systematic backups (e.g., daily, weekly, monthly, etc.) of a data storage volume. The frequency of the backups generally depends upon the use of the storage volume and whether a significant amount of data changes on a regular basis. Furthermore, most backup systems utilize only a fixed number of snapshots. With this restriction, backup systems are generally required to delete the oldest snapshot prior to creating a new snapshot that represents the current point-in-time of the data storage volume. This is cumbersome to backup system managers because each time a new snapshot is created it is assigned new attributes such as a World Wide Name (WWN), Logical Unit Number (LUN), Serial Number, and the like, which requires the backup system manager to reconfigure the backup application for the new snapshot volume information. Furthermore, since, in most cases, the volume looks like a new volume to the backup application, one cannot perform incremental backups due to the fact that the backup application does not know about the "new" volume.

SUMMARY

The present invention is directed to solving these and other problems and disadvantages of the prior art. In accordance with embodiments of the present invention, a service for efficiently resetting a snapshot is provided. The method generally comprises receiving a command to reset a first snapshot of a master volume, where the first snapshot includes a first array partition and first snapshot data. The method continues by disassociating the first array partition from the first snapshot and associating the first array partition with a second snapshot of the master volume. After disassociating and associating the first array partition, the method continues by updating the first array partition to reflect a size of the master volume at a point-in time associated with the second snapshot. Typically the first array partition is disassociated from the first snapshot prior to being associated with the second snapshot, but such an order of events is not required. For example, the disassociation and association may be contemporaneous or the association may occur prior to the disassociation.

As used herein, the terms "partition" and "array partition" represent the entity (e.g., the snapshot and corresponding master volume) to the outside world, that is applications running outside the storage controller. In essence, the array partition represents the attributes and identity of the volume. In other words, the array partition represents the name, LUN, and serial number of the volume. These identifying characteristics may be used by a backup application and other entities such as access control lists, zoning, and so on to indicate how the volume is to be used. One aspect of the present invention is that these identifying characteristics remain unchanged during and after a snapshot reset. Only the data underlying is changed, so that to the external application, it appears as though the data has been updated as opposed to having a snapshot being removed and then having the data replaced.

In accordance with at least some embodiments of the present invention, the first snapshot (i.e., the snapshot firstly associated with the first array partition) is deleted and the second snapshot (i.e., the snapshot secondly associated with the first array partition) is created as a new snapshot via the reset operation. However, in accordance with certain embodiments of the present invention, the second snapshot may correspond to a snapshot in existence before the reset operation is initiated. Accordingly, an array partition may be transferred between existing snapshots as well as from an existing snapshot to a new snapshot.

In accordance with at least some embodiments of the present invention, a device for controlling a storage system is provided. The device may comprise a reset application adapted to receive a reset command and in response to receiving a reset command, transfer a first array partition associated with first snapshot of a master volume to a second snapshot of the master volume, where the first array partition provides access to a virtual disk drive which can read and/or write fixed memory block addresses. The array partition transferred from the first snapshot to the second snapshot carries with it certain attributes (e.g., a global identifier such as a WWN, a LUN, a Serial Number, and a zoning of the LUN) that allow a backup application to reference the second snapshot in the same way that it previously referenced the first snapshot. Accordingly, reconfiguration of backup systems is minimized due to the use of a recycled array partition realized under a snapshot reset operation.

Additional features and advantages of embodiments of the present invention will become more readily apparent from the following description, particularly when taken together with the accompanying drawings.

DETAILED DESCRIPTION

In accordance with embodiments of the present invention, a snapshot is a block level point-in-time representation of data on a storage volume. The data is essentially frozen in time at the instant that the snapshot is taken. Although data on the storage volume may change as a result of write operations, the data represented by the snapshot will remain constant and frozen in time at the instant that the snapshot was taken. In order to preserve snapshot data, a backing store, also known as a snap pool, is used to store data that is not otherwise represented in the storage volume and snapshot metadata. All data and metadata associated with the snapshot is stored in the backing store. In accordance with embodiments of the present invention, data is stored within the snapshot in "chunks". A chunk is equivalent to a number of Logical Block Addresses (LBAs). Alternatively or in addition, data can be stored within subchunks. A subchunk is a fixed size subset of a chunk. Pointers, table entries, or other data structures can be used to identify the location of a chunk in the backing store.

Figure 1:
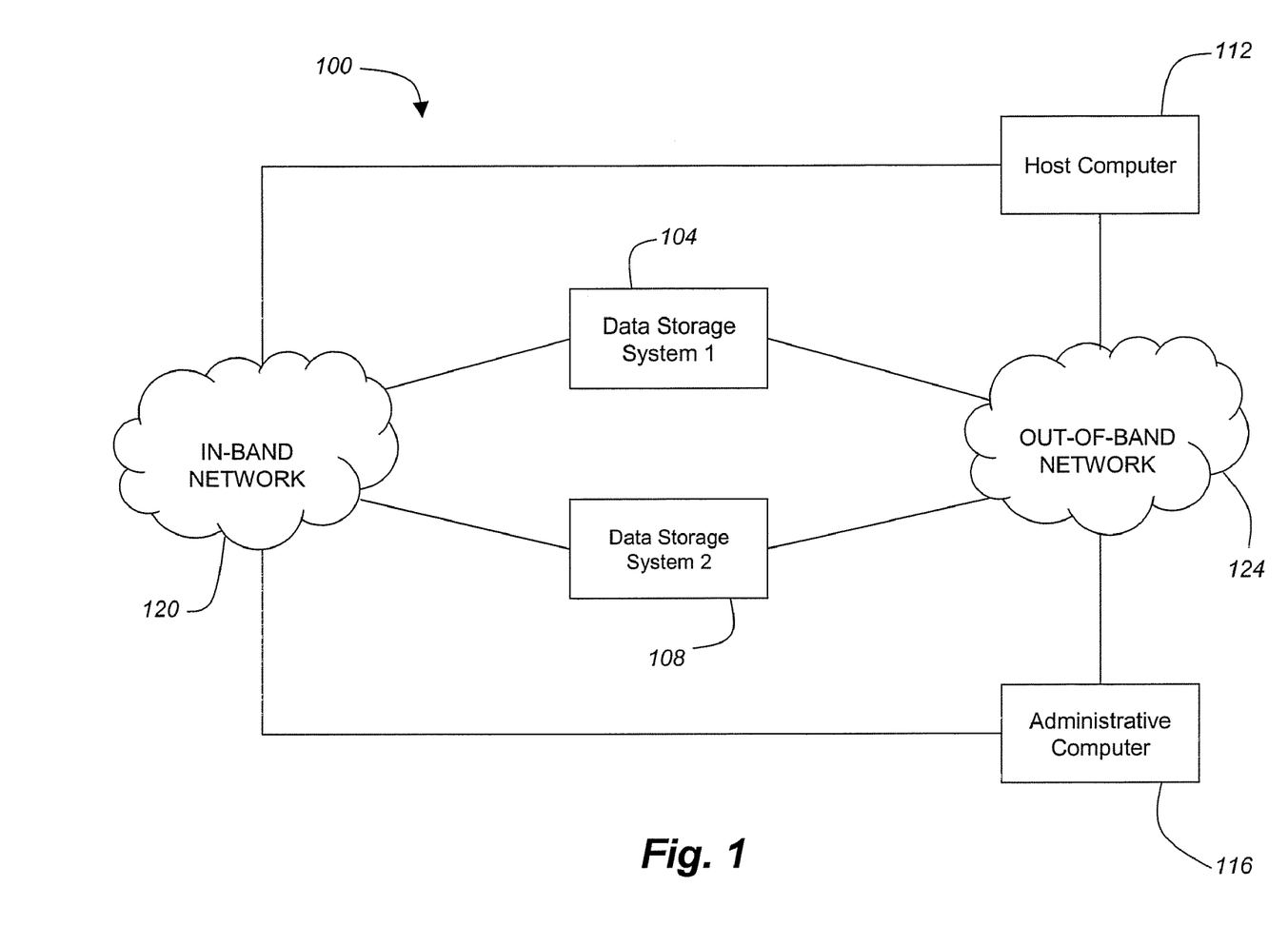
FIG. 1 is a functional block diagram depicting components of an electronic data system incorporating one or more data storage systems in accordance with embodiments of the present invention.

FIG. 1 is a block diagram depicting an electronic data system 100 in accordance with embodiments of the present invention incorporating a first data storage system 104 and a second data storage system 108. The electronic data system 100 may also include one or more host processors, computers or computer systems 112. In addition, the electronic data system 100 may include or may be interconnected to an administrative computer 116. As will be appreciated by one of skill in the art after consideration of the present disclosure, embodiments of the present invention have application in association with single or multiple hosts 112 in storage area network (SAN) or direct connect environments.

The data storage systems 104, 108 are typically interconnected to one another through an in-band network 120. The in-band network 120 may also interconnect the data storage systems 104, 108 to a host computer 112 and/or an administrative computer 116. The electronic data system 100 may also include an out-of-band network 124 interconnecting some or all of the electronic data system 100 nodes 104, 108, 112 and/or 116. For example, one or more host computers 112 are connected to each data storage system 104, 108. For instance, a first data storage system 104 is connected to a second data storage system 108 across some distance by a Fibre Channel or a TCP/IP network 120, and each of these data storage systems 104, 108 is connected to a host computer 112 through an in-band 120 and/or an out-of-band 124 network.

The in-band or storage area network 120 generally functions to transport data between data storage systems 104 and/or 108 and host devices 112, and can be any data pipe capable of supporting multiple initiators and targets. Accordingly, examples of in-band networks 120 include Fibre Channel (FC), iSCSI, parallel SCSI, Ethernet, ESCON, or FICON connections or networks, which may typically be characterized by an ability to transfer relatively large amounts of data at medium to high bandwidths. The out-of-band network 124 generally functions to support the transfer of communications and/or commands between various network nodes, such as data storage resource systems 104, 108, host computer 112, and/or administrative computers 116, although such data may also be transferred over the in-band communication network 120. Examples of an out-of-band communication network 124 include a local area network (LAN) or other transmission control protocol/Internet protocol (TCP/IP) network. In general, the out-of-band communication network 124 is characterized by an ability to interconnect disparate nodes or other devices through uniform user interfaces, such as a web browser. Furthermore, the out-of-band communication network 124 may provide the potential for globally or other widely distributed management of data storage systems 104, 108 via TCP/IP.

Every electronic data system node or computer 104, 108, 112 and 116, need not be interconnected to every other node or device through both the in-band network 120 and the out-of-band network 124. For example, no host computer 112 needs to be interconnected to any other host computer 112, data storage system 104, 108, or administrative computer 116 through the out-of-band communication network 124, although interconnections between a host computer 112 and other devices 104, 108, 116 through the out-of-band communication network 124 are not prohibited. As another example, an administrative computer 116 may be interconnected to at least one storage system 104 or 108 through the out-of-band communication network 124. An administrative computer 116 may also be interconnected to the in-band network 120 directly, although such an interconnection is not required. For example, instead of a direct connection, an administrator computer 116 may communicate with a controller of a data storage system 104, 108 using the in-band network 120.

In general, a host computer 112 exchanges data with one or more of the data storage systems 104, 108 in connection with the performance of the execution of application programming, whether that application programming concerns data management or otherwise. Furthermore, an electronic data system 100 may include multiple host computers 112. An administrative computer 116 may provide a user interface for controlling aspects of the operation of the storage systems 104, 108. The administrative computer 116 may be interconnected to the storage system 104, 108 directly, and/or through a bus or network 120 and/or 124. In accordance with still other embodiments of the present invention, an administrative computer 116 may be integrated with a host computer 112. In addition, multiple administrative computers 116 may be provided as part of the electronic data system 100. Furthermore, although two data storage systems 104, 108 are shown in FIG. 1, an electronic data system 100 may include more than two data storage systems or may include a single data storage system.

Figure 2:
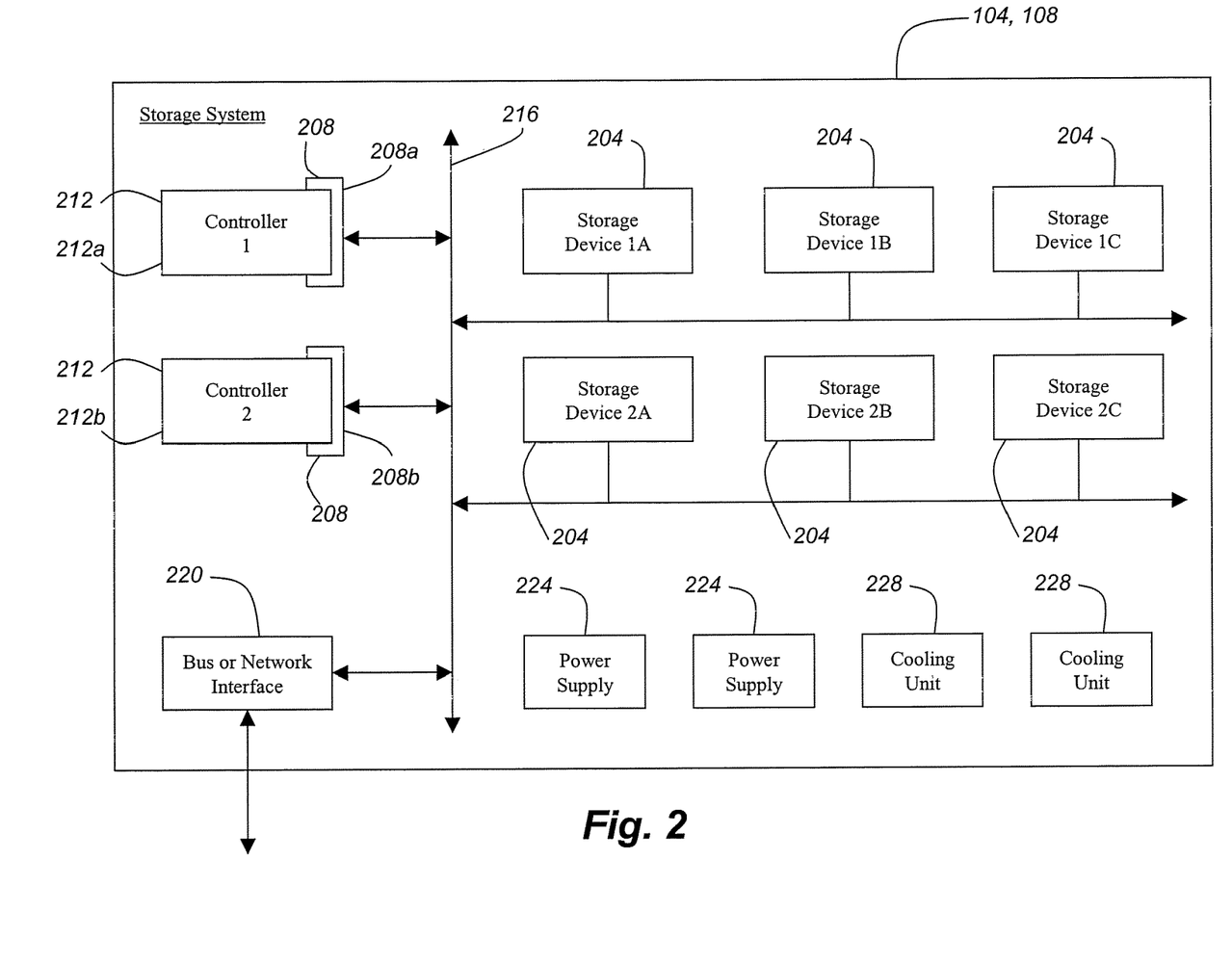
FIG. 2 is a block diagram depicting components of a data storage system in accordance with embodiments of the present invention.

FIG. 2 illustrates components that may be included in a data storage system 104, 108 in accordance with embodiments of the present invention. In general, the data storage system 104, 108 includes a number of storage devices 204. Examples of storage devices 204 include hard disk drives, such as serial advanced technology attachment (SATA), small computer system interface (SCSI), serial attached SCSI (SAS), Fibre Channel (FC), or parallel advanced technology attached (PATA) hard disk drives. Other examples of storage devices 204 include magnetic tape storage devices, optical storage devices, or solid state disk devices. Furthermore, although a number of storage devices 204 are illustrated, it should be appreciated that embodiments of the present invention are not limited to any particular number of storage devices 204, and that a lesser or greater number of storage devices 204 may be provided as part of a data storage system 104. As can be appreciated by one of skill in the art, one or more arrays and/or array partitions, hereinafter referred to as logical unit numbers (LUNs) comprising a storage volume, may be established on the data storage devices 204. As can be further appreciated by one of skill in the art, a LUN may be implemented in accordance with anyone of the various array levels or other arrangements for storing data on one or more storage devices 104. As can also be appreciated by one of skill in the art, the storage devices 204 may contain data comprising a master storage volume, which may correspond to a LUN, in addition to one or more snapshots of the master storage volume taken at different times. As can further be appreciated by one of skill in the art, snapshots may comprise metadata and data stored in a backing store on the storage devices 204. As can also be appreciated by one of skill in the art, the storage devices 204 contain data comprising a master storage volume, which may correspond to a LUN, and one or more snapshots of the storage volume taken at different times. In one embodiment, the snapshots may be mapped to the LUNs and stored on a backing store. However, the backing store, which also occupies an array and/or array partition, does not have a LUN number assigned to it, thus making the backing store invisible to a host computer 112 and/or administrative computer 116.

A data storage system 104, 108, in accordance with embodiments of the present invention, may be provided with a first controller slot 208a. In addition, other embodiments may include additional controller slots, such as a second controller slot 208b. As can be appreciated by one of skill in the art, a controller slot 208 may comprise a connection or set of connections to enable a controller 212 to be operably interconnected to other components of the data storage system 104, 108. Furthermore, a data storage system 104, 108 in accordance with embodiments of the present invention includes at least one controller 212a. For example, while the data storage system 104, 108 is operated in a single controller, non-failover mode, the data storage system 104, 108 may include exactly one controller 212. A data storage system 104, 108 in accordance with other embodiments of the present invention may be operated in a dual redundant active-active controller mode by providing a second controller 212b. When a second controller 212b is used in addition to a first controller 212a, the second controller slot 208b receives the second controller. As can be appreciated by one of skill in the art, the provision of two controllers, 212a and 212b, permits data to be mirrored between the controllers 212a-212b, providing redundant active-active controller operation.

One or more busses or channels 216 are generally provided to interconnect a controller or controllers 212 through the associated controller slot or slots 208 to the storage devices 204. Furthermore, while illustrated as a single shared bus or channel 216, it can be appreciated that a number of dedicated and/or shared buses or channels may be provided. Additional components that may be included in a data storage system 104 include one or more power supplies 224 and one or more cooling units 228. In addition, a bus or network interface 220 may be provided to interconnect the data storage system 104, 108 to the bus or network 112, and/or to a host computer 108 or administrative computer 116.

Although illustrated as a complete RAID system in FIG. 2, it should be appreciated that the data storage system 104, 108 can comprise one or more storage volumes implemented in various other ways. For example, the data storage system 104, 108 may comprise a hard disk drive or other storage device 204 connected or associated with a server or a general-purpose computer. As further examples, the storage system 104 may comprise a Just a Bunch of Disks (JBOD) system or a Switched Bunch of Disks (SBOD) system.

Figure 3:
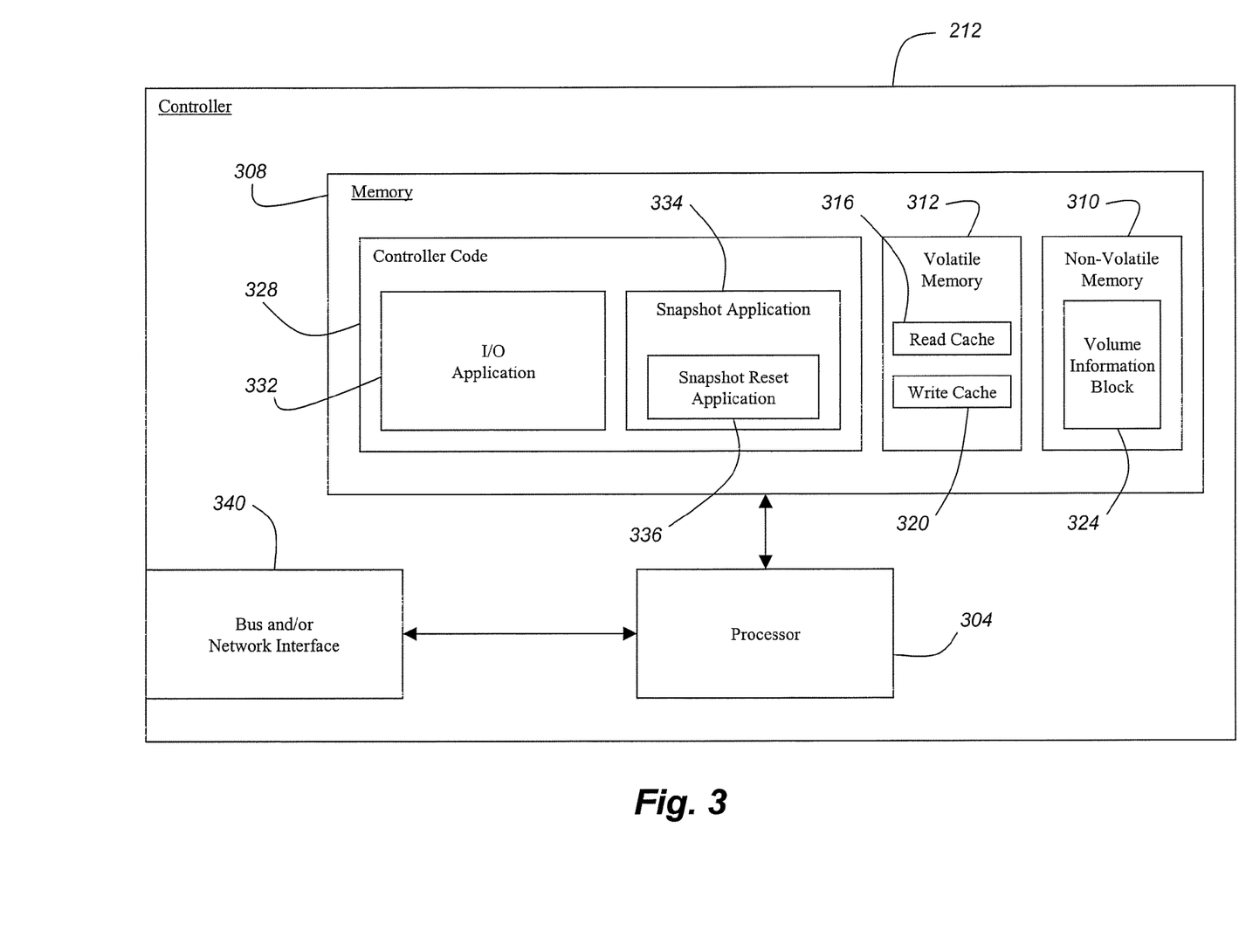
FIG. 3 is a block diagram depicting components of a storage controller in accordance with embodiments of the present invention.

FIG. 3 illustrates aspects of a storage controller 212 in accordance with embodiments of the present invention. In general, a storage controller 212 includes a processor subsystem 304 capable of executing instructions for performing, implementing and or controlling various controller 212 functions. Such instructions may include instructions for implementing aspects of a snapshot reset method and apparatus. Furthermore, such instructions may be stored as software and/or firmware. As can be appreciated by one of skill in the art, operations concerning the generation of parity data or other operations may be performed using one or more hardwired and/or programmable logic circuits provided as part of the processor subsystem 304. Accordingly, the processor subsystem 304 may be implemented as a number of discrete components, such as one or more programmable processors in combination with one or more logic circuits. Processor subsystem 304 may also include or be implemented as one or more integrated devices or processors. For example a processor subsystem may comprise a complex programmable logic device (CPLD).

A controller 212 also generally includes memory 308. The memory 308 is not specifically limited to memory of any particular type. For example, the memory 308 may comprise a solid-state memory device, or a number of solid-state memory devices. In addition, the memory 308 may include separate non-volatile memory 310 and volatile memory 312 portions. As can be appreciated by one of skill in the art, the memory 308 may include a read cache 316 and a write cache 320 that are provided as part of the volatile memory 312 portion of the memory 308, although other arrangements are possible. By providing caches 316, 320, a storage controller 212 can improve the speed of input/output (I/O) operations between a host 112 and the data storage devices 204 comprising an array or array partition. Examples of volatile memory 312 include DRAM and SDRAM.

The non-volatile memory 310 may be used to store data that was written to the write cache of memory 308 in the event of a power outage affecting the data storage system 104. The non-volatile memory portion 310 of the storage controller memory 308 may include any type of data memory device that is capable of retaining data without requiring power from an external source. Examples of non-volatile memory 310 include, but are not limited to, compact flash or other standardized non-volatile memory devices.

A volume information block 324 may be stored in the non-volatile memory 310, although in accordance with at least some embodiments of the present invention, the volume information block 324 resides in volatile memory 312. The volume information block 324 comprises data that may be used to represent attribute and state information for master volumes, backing stores, and/or snapshots. Each master volume, backing store, and snapshot is typically associated with a different volume information block 324. The volume information block 324 is generally employed by the processor 304 to determine whether certain data is located on master volumes, backing stores, and/or snapshots and whether such data is safe to access based on the state of each. For example, the state of a master volume or backing store may be such that if data access were attempted, data corruption may occur. Accordingly, the volume information block 324 may be referenced prior to data access during an I/O operation.

The memory 308 also includes portions of the memory 308 comprising a region that provides storage for controller code 328. The controller code 328 may comprise a number of components, including an I/O application 332 comprising instructions for accessing and manipulating data. The I/O application 332 may provide the controller 212 with the ability to perform read and/or write operations of data on a storage volume and/or on a snapshot. The I/O application 332 may reference the volume information block 324 prior to executing such operations. The I/O application 332 may also employ the read and write caches 316 and 320 respectively when performing such operations.

A snapshot application 334 is an example of another application that may be included in the controller code 328. Although depicted as separate from the I/O application 332, the snapshot application 334 may comprise functionality similar to the I/O application 332. The snapshot application 334 is essentially responsible for the creation and management of various snapshots on a given storage volume.

In accordance with at least some embodiments of the present invention, the snapshot application may comprise a snapshot reset application 336. While the snapshot reset application 336 is shown as being a module within the snapshot application 334, one skilled in the art will appreciate that alternative embodiments of the present invention may employ the snapshot reset application 336 as a separate entity from the snapshot application 334.

The snapshot reset application 336 may be adapted to reset an older snapshot with newer snapshot data. In accordance with at least some embodiments of the present invention, the snapshot reset application 336 may perform a synchronized snapshot delete/create operation that allows the snapshot created under the create portion of the operation to assume at least some properties of the snapshot deleted under the delete portion of the operation. For instance, the snapshot reset application 336 may afford the ability to transfer an array partition associated with one snapshot to another snapshot. In a more specific example, the snapshot reset application 336 may disassociate an array partition with a snapshot that is going to be deleted and then re-associate it with a new snapshot that is being created for a given storage volume.

A storage controller 212 may additionally include other components. For example, a bus and/or network interface 344 may be provided for operably interconnecting the storage controller 212 to the remainder of the data storage system 104, for example through a controller slot 208 and a bus or channel 216. Furthermore, the interface 344 may be configured to facilitate removal or replacement of the storage controller 212 in a controller slot 208 as a field replaceable unit (FRU). In addition, integral signal and power channels may be provided for interconnecting the various components of the storage controller 212 to one another.

Figure 4A:
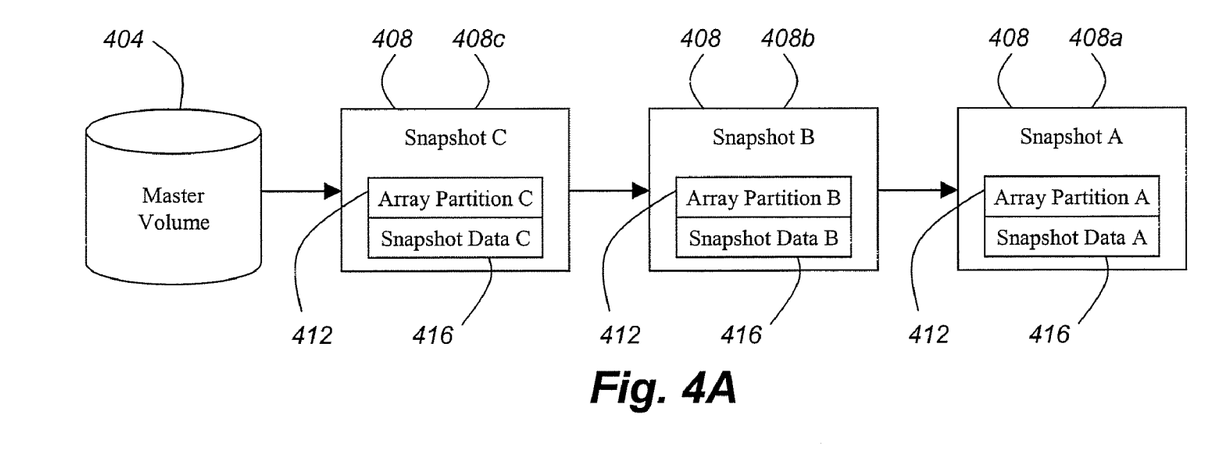
FIG. 4A is a block diagram depicting a series of snapshots of a master volume in accordance with embodiments of the present invention.
Figure 4B:
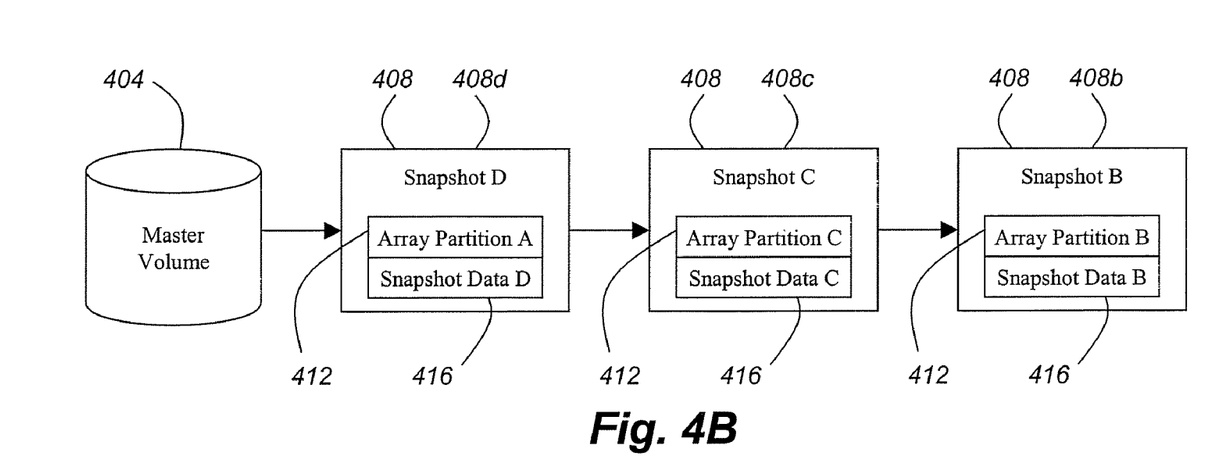
FIG. 4B is a block diagram depicting a series of snapshots and a reset snapshot of a master volume in accordance with embodiments of the present invention.

With reference to FIGS. 4A and 4B, a series of snapshots and reset snapshots will be described in accordance with at least some embodiments of the present invention. Referring initially to FIG. 4A, a master volume 404 is depicted having three snapshots 408a, 408b, and 408c associated therewith. The snapshots 408 are ordered based on their relative age where the first snapshot 408a is an older snapshot of the master volume 404 than the second snapshot 408b, while both the first 408a and second 408b snapshots are older snapshots of the master volume 404 than the third snapshot 404c. Accordingly, if the I/O application 332 were searching for snapshot data associated with the second snapshot 408b, the I/O application 332 would first search the second snapshot 408b, and if the data were not found there, the I/O application 332 would search the third snapshot 408c. If the data were not on the third snapshot 408c, then the I/O application 332 would find the data on the master volume 404.

Each snapshot 408 may be created with a separate and distinct array partition 412 and snapshot data 416. The array partition 412 of each snapshot 408 provides the controller 212 access to a virtual disk drive which can read or write fixed blocks addressed by LBA. An array partition can have a number of assigned attributes such as a LUN, Serial Number, zoning on the LUN (access control for the LUN), a global identifier such as a WWN, and the like. The array partition 412 attributes describe how a host 112 and/or administrative computer 116 can access 10 the snapshot 408, and more specifically the snapshot data 416. In accordance with at least some embodiments of the present invention, the array partition 412 is transferable between snapshots 408. The array partition 412 may define or store the attributes for reference by other applications in the form of metadata.

The snapshot data 416, on the other hand, is the actual data representing the point-in-time of the master volume 404 when the snapshot 408 was taken. The snapshot data 416 may be divided logically into chunks, subchunks and/or any other data organizational format known in the art. The snapshot data 416 may be updated with a copy on write (COW) operation that occurs with a change to the master volume 404. In accordance with at least some embodiments of the present invention, the snapshot data 416 may initially be empty. But as changes occur that alter the master volume 404 from the point-in-time captured by the snapshot 408, a COW operation causes the data from the master volume 404 to be transferred to the snapshot data 416 prior to executing the requested change of the master volume 404.

Referring now to FIG. 4B, the snapshot reset application 336 may reset an existing snapshot 408 (e.g., the first snapshot 408a) into a new snapshot 408 (e.g., a fourth snapshot 408d). The reset application 336 may cause the array partition 412 associated with the first snapshot 408a to disassociate with the first snapshot 408a then re-associate with the fourth snapshot 408d. As a result, the fourth snapshot 408d comprises all of the same attributes (e.g., a global identifier (e.g., WWN), LUN, Serial Number, zoning of the LUN, etc.) of the first snapshot 408a and an external application does not have to reconfigure itself to a new array partition 412. As a result of the first snapshot 408a losing its array partition 412 its snapshot data can no longer be accessed because identifying data or addresses now refer to the fourth snapshot.

As can be seen in FIG. 4B, the fourth snapshot 408d comprises its own snapshot data 416 to represent the master volume 404. However, the fourth snapshot 408d utilizes a pre-existing array partition 412 (e.g., from the first snapshot 408a). The array partition 412 may be updated to reflect the current size of the master volume 404 but otherwise is left with the same attributes that were used for the first snapshot 408a. Additionally, the fourth snapshot 408d is assigned a new age that makes it the newest snapshot 408 as compared to the second and third snapshots 408b and 408c respectively.

Figure 5:
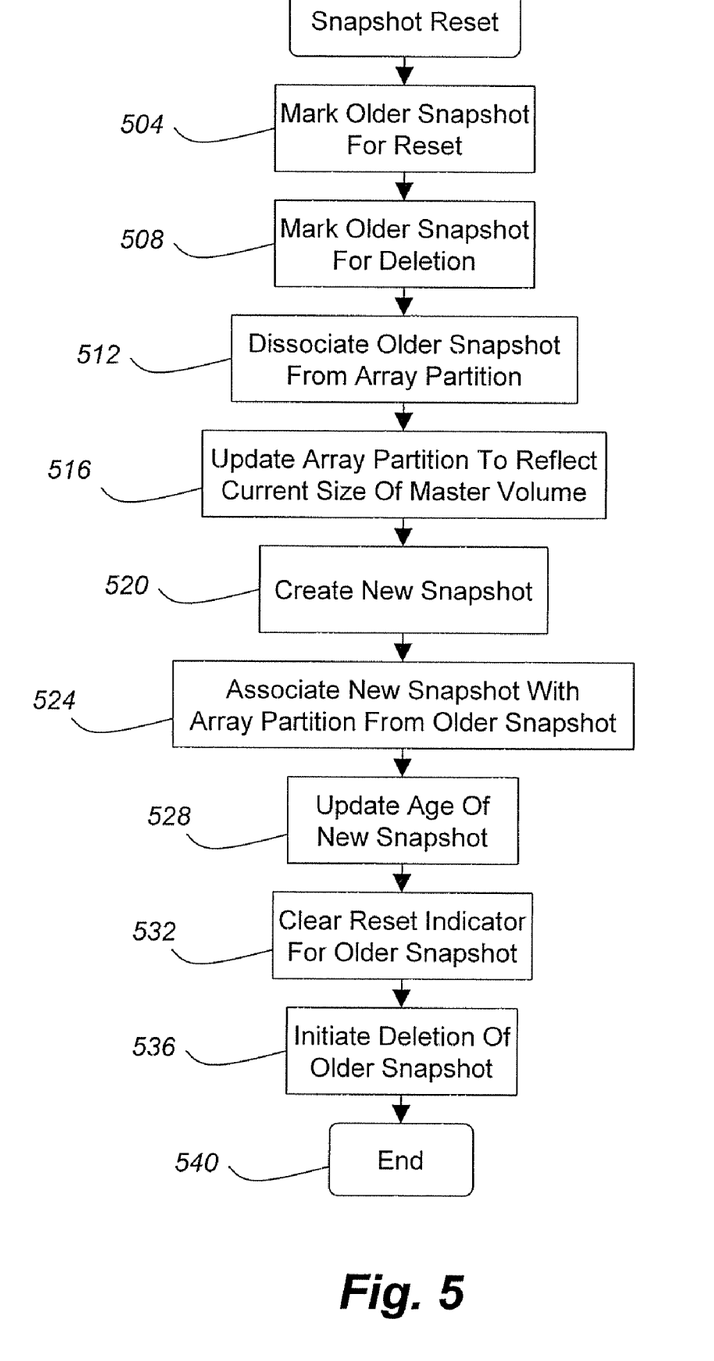
FIG. 5 is a flow chart depicting a method of resetting a snapshot in accordance with embodiments of the present invention.

FIG. 5 is a flow diagram depicting a method of resetting a snapshot 408 in accordance with at least some embodiments of the present invention. A snapshot reset operation is commenced when the controller 212 receives a command to reset a currently existing snapshot (e.g., older snapshot 408) into a new snapshot 408 of the master volume 404. Once the snapshot reset operation is initiated, the snapshot reset application 336 marks the older snapshot 408 for reset (step 504). The reset mark for the older snapshot 408 may be registered in the volume information block 324 such that the I/O application 332 does not attempt to access or otherwise use the snapshot data 416 from the older snapshot 408. However, in accordance with at least some embodiments of the present invention, a host 112 may still be allowed to access the snapshot data 416 from the older snapshot 408 while it is marked for reset, at least until such data is deleted. Each snapshot 408 may have a dedicated bit in the volume information block 324 that, if selected, indicates the corresponding snapshot 408 is marked for reset. Alternatively, an unselected reset bit in the volume information block 324 may provide the appropriate indication that the snapshot 408 is marked for reset.

After the older snapshot 408 has been marked for reset, the snapshot reset application 336 marks the older snapshot 408 for deletion (step 508). The deletion mark for the older snapshot 408 may also be registered in the volume information block 324. By marking the older snapshot 408 for reset prior to deletion, the older snapshot 408 is temporarily maintained in memory, on disk, or anywhere else where storage is available. Whereas if the older snapshot 408 were simply marked for deletion, then the older snapshot 408 would be deleted and its array partition 412 would be lost. By marking the older snapshot 408 for reset and then deletion, the snapshot reset application 336 also causes the older snapshot 408 to be disassociated from its array partition 412 (step 512). The disassociation of the older snapshot 408 from the array partition 412 releases the array partition 412 thereby allowing it to be assigned to another snapshot 408. The actual attributes of the array partition 412 are not altered as a result of the disassociation but rather are freed from the older snapshot 408 for use by another snapshot 408. The array partition 412 may be selectively associated and disassociated by altering the reference between a given snapshot 408 and the array partition 412 in the volume information block 324.

Once the older snapshot 408 and its array partition 412 have been adequately disassociated, the snapshot reset application 336 continues by updating the array partition 412 to reflect the current size of the master volume 404 (step 516). Most times, user changes do not affect the size of the master volume 404. Therefore, the snapshots are usually of the same size. However, since the array partition 412 is used to describe the current size of the master volume 404 at the point-in-time corresponding to the snapshot 408, this step is important to cover the case when the user changes the size of the master volume. Accordingly, since the array partition 412 is disassociated with the older snapshot 408 it needs to be updated to reflect the size of the master volume 404 at the current point-in-time rather than a previous point-in-time. However, all other volume attributes such as its global identifier, LUN, Serial Number, and zoning of the LUN remain unchanged.

The snapshot reset application 336 continues by creating a new snapshot 408 that will provide a representation of the master volume 404 at the point-in-time corresponding to the execution of the reset operation (step 520). The creation of a new snapshot 408 generally comprises allocating the required memory for the new snapshot 408, then generating and storing the various data structures that will ultimately be employed to store snapshot data 416. The data structures created in this step are preferably organized in a tabular fashion employing pointers and the like but any other data organization technique known in the art may also be employed.

While creating the new snapshot 408, the snapshot reset application 336 associates the new snapshot 408 with the array partition 412 from the older snapshot 408 (step 524). The association causes the new snapshot 408 to receive the same array partition attributes previously assigned to the older snapshot 408. This way the snapshot can be referred to in the same manner, for example by its global identifier and Serial Number. This association also allows the newer snapshot 408 to be assigned to the same LUN that the older snapshot 408 was assigned to. This allows a backup application running on a host computer 112 and/or administrative computer 116 to reference the new snapshot 408 in the same way the older snapshot 408 was referenced. Furthermore, it obviates the need to allocate additional backing store resources to the new snapshot 408.

After the new snapshot 408 has been associated with the array partition 412 from the older snapshot 408, the age of the new snapshot 408 and correspondingly the age of the array partition 412 is set to reflect the master volume 404 at the current point-in-time (step 528). Accordingly, the new snapshot 408 is assigned an age that is newer as compared to all other snapshots of the master volume 404. As a result of the new snapshot 408 being assigned such an age all changes to the master volume 404 are reflected by COW operations that write data to the new snapshot 408, even though some of that data may reflect a point-in-time associated with another snapshot 408. Data will continue to be written to the new snapshot 408 until another snapshot 408 of the master volume 404 is taken at which point the newest snapshot 408 will begin receiving the data.

With the creation of the new snapshot 408 completed, the reset indicator for the older snapshot 408 is cleared from the volume information block 324 (step 532). The release of the reset indicator leaves only the delete indicator marked in the volume information block 324. Accordingly, the snapshot reset application 336 identifies that the older snapshot 408 is no longer needed for a reset operation and initiates the deletion of the older snapshot 408 (step 536). The snapshot reset application 336 deletes the older snapshot 408 by deleting the snapshot data 416 associated with the older snapshot 408 as well as the data structures previously used to store the snapshot data 416. The snapshot reset application 336 may also delete any residual information previously associated with the older snapshot 408 from the volume information block 324. Thereafter, the method ends and the controller 212 awaits receipt of a new command (step 540).

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such, or in other embodiments, and with the various modifications required by their particular application or use of the invention. It is intended that the appended claims be construed to include alternative embodiments to the extent permitted by the prior art.

What is claimed is:

1. A device for controlling a storage system, comprising:
   a processor; and
   a memory, coupled to the processor, comprising:
      a reset application adapted to receive a reset command and in response to receiving the reset command, save partition attributes of a first snapshot of a master volume, delete the first snapshot, create a second snapshot and copy the saved partition attributes of the first snapshot to the second snapshot,
      wherein a first array partition comprising the saved partition attributes provides access to a virtual disk drive comprising at least one of read and write fixed memory block addresses, wherein the reset application is adapted to mark the first snapshot for reset, then mark the first snapshot for deletion, wherein the reset application creates the second snapshot while transferring the first array partition to the second snapshot, wherein after the first array partition has been associated with the second snapshot, release the reset mark associated with the first snapshot thereby allowing the first snapshot to be deleted, wherein the saved partition attributes comprises at least one of a volume name, Logical Unit Number (LUN), Serial Number, and zoning on the LUN.

2. The device of claim 1, wherein the virtual disk drive is adapted to at least one of read and write fixed blocks addressed by Logical Block Addresses (LBAs).

3. The device of claim 1, wherein the first array partition comprises a first set of attributes that remain unchanged when the first array partition is transferred from the first snapshot to the second snapshot.

4. The device of claim 1, wherein the reset application is further adapted to alter the first array partition to reflect a size of the master volume at a point-in-time associated with the second snapshot.

5. A method for controlling a storage system, comprising:
   receiving a reset command by a reset application, and in response:
      saving, by a processor coupled to a memory comprising the reset application and executing the reset application, partition attributes of a first array partition associated with a first snapshot of a master volume to a second snapshot of the master volume;
      marking, by the processor executing the reset application, the first snapshot for reset;
      marking, by the processor executing the reset application, the first snapshot for deletion after marking the first snapshot for reset;
      creating, by the processor executing the reset application, the second snapshot in response to receiving the reset command, wherein the processor executing the reset application creates the second snapshot while transferring the partition attributes of the first array partition to the second snapshot;
      after associating the first array partition with the second snapshot; and
      releasing, by the processor executing the reset application, the reset mark associated with the first snapshot thereby allowing the first snapshot to be deleted,
   wherein the first array partition provides access to a virtual disk drive comprising at least one of read and write fixed memory block addresses, wherein the saved partition attributes comprises at least one of a volume name, Logical Unit Number (LUN), Serial Number, and zoning on the LUN.

6. The method of claim 5, wherein the virtual disk drive is adapted to at least one of reading and writing fixed blocks addressed by Logical Block Addresses (LBAs).

7. The method of claim 5, wherein the first array partition comprises a first set of attributes that remain unchanged when the processor is transferring the first array partition from the first snapshot to the second snapshot.

8. The method of claim 5, further comprising:
   altering, by the processor executing the reset application, the first array partition to reflect a size of the master volume at a point-in-time associated with the second snapshot.

* * * * *